April 21, 1925.

J. J. DUGAN 1,534,928

METHOD OF COATING AND ALLOYING METALS

Filed Oct. 2, 1920

James J. Dugan
INVENTOR

BY Victor J. Evans
ATTORNEY

Patented Apr. 21, 1925.

1,534,928

UNITED STATES PATENT OFFICE.

JAMES J. DUGAN, OF WILMINGTON, DELAWARE.

METHOD OF COATING AND ALLOYING METALS.

Application filed October 2, 1920. Serial No. 414,197.

*To all whom it may concern:*

Be it known that I, JAMES J. DUGAN, a citizen of the United States, residing at Wilmington, in the county of Newcastle and State of Delaware, have invented new and useful Improvements in Methods of Coating and Alloying Metals, of which the following is a specification.

This invention relates to the art of welding, alloying and uniting steel and non-ferreous metals, such as copper and the like.

An object of the present invention is the provision of an improved method of welding, alloying and uniting steel and non-ferreous metals, which is exceedingly simple and in which the depth of the weld or alloy may be regulated as desired.

Another object is the provision of a method of as above stated, which results in a product that may be forged, stamped, pressed, rolled, expanded or otherwise worked in any manner without injury to the weld, maintaining the same sectional ratio of weld or alloy and the product may be thereafter cold drawn, cold rolled, stamped, pressed or expanded without injury to the weld, the result being a product which is especially useful in the manufacture of electric conductors of high conductivity, rods, strips, sheets, plates and tubes of various shapes and sections.

In the drawings, in which the product is illustrated;

Figure 1:
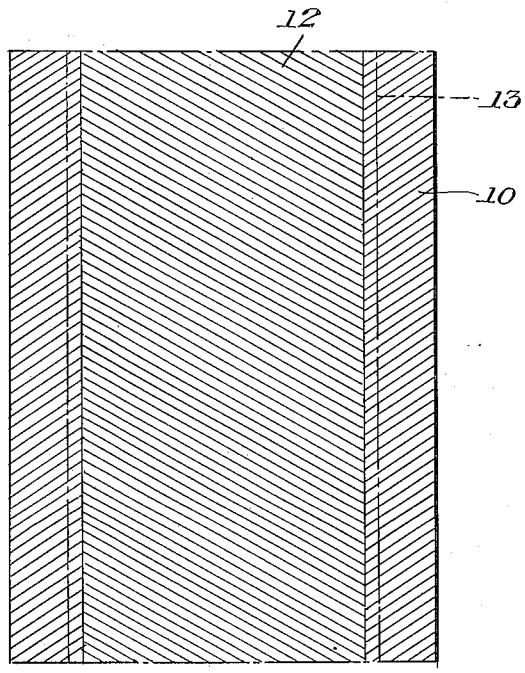
Figure 1 is a cross sectional view through a steel billet having a copper coating secured thereto by the use of the method which constitutes the present invention.

In practice, the sheet copper (at ordinary temperature, i. e., unheated) is preferably placed within the walls of a mould so as to provide a lining for the mould. This mould may be of any desired shape depending upon the shape of the finished product desired. For example, it may be rectangular or circular in cross section. The sheet copper 10 or 11 will be placed against the inner face of the walls of the mould. While copper has been specified, any non-ferreous metal may be substituted.

Steel heated to a degree in excess of 2800° F. is then poured within the copper lining so as to entirely fill the latter, as shown at 12 in the drawings. This causes the adjacent or inner face of the lining 10 or 11 to melt so that the copper and steel is commingled and an exceedingly effective weld joins the two metals. This produces at the zone of union of the core and jacket, an alloy layer or "weld," as shown at 13 and 14 in the drawings.

Figure 2:
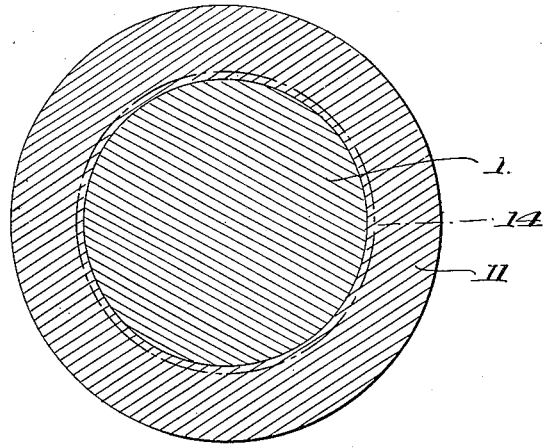
Figure 2 is a similar view showing a cylindrical billet having a steel core with a copper coating or casing surrounding the core.

The particular thickness required in this weld layer, may be secured by subjecting the product to an appropriate cooling action, the length of time of this cooling operation determining the thickness of the weld layer. It will be obvious that this can be accomplished by the use of a predetermined amount of positive cooling in combination with natural cooling. It will be understood that slow cooling produces a thick weld layer, and quick cooling produces a thin weld layer. For example, in Figure 1 the depth or thickness of the weld is indicated at 13 and in Figure 2 at 14. The weld in the last mentioned figure is of relatively less depth or thickness, because of the fact that the cooling action to which the product in Figure 2 has been subjected was quicker than that used in connection with producing the device shown in Figure 1.

By the use of the above described method, a product of very high quality results, the method further being of such an exceedingly simple character as to be readily understood by persons not skilled in the art to which it appertains.

Minor changes may be made without departing from the spirit or sacrificing any of the advantages of the invention, as fall within the scope of the appended claim.

Having described the invention what is claimed is:—

The method of forming a metal ingot comprising a steel core having a casing of non-ferrous metal weld-united thereto, which comprises introducing into the mold, a casing composed of the non-ferrous metal in the form of a solid of predetermined thickness, and while this casing is initially at substantially atmospheric temperature, filling said casing with molten steel heated to a temperature of not substantially below 2800° F., by pouring the steel into said casing in the mold, to completely fuse a desired depth of the inner surface of the non-ferrous metal, and thereby causing the two metals to interpenetrate and weld together, and finally cooling product while regulating the speed of such cooling, to produce a weld portion of the desired thickness, while preventing iron from alloying with the external portions of the non-ferrous metal.

In testimony whereof I affix my signature.

JAMES J. DUGAN.